(12) United States Patent
Bache et al.

(10) Patent No.: US 11,003,467 B2
(45) Date of Patent: May 11, 2021

(54) VISUAL HISTORY FOR CONTENT STATE CHANGES

(71) Applicant: ADOBE INC., San Jose, CA (US)

(72) Inventors: Jesper Storm Bache, Menlo Park, CA (US); Bradee Rae Evans, Alameda, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 15/465,843

(22) Filed: Mar. 22, 2017

(65) Prior Publication Data

US 2018/0276004 A1    Sep. 27, 2018

(51) Int. Cl.
| | |
|---|---|
| *G06F 3/00* | (2006.01) |
| *G06F 9/451* | (2018.01) |
| *G06F 3/0482* | (2013.01) |
| *G06F 8/38* | (2018.01) |
| *G06F 3/0488* | (2013.01) |

(52) U.S. Cl.
CPC ............ *G06F 9/451* (2018.02); *G06F 3/0482* (2013.01); *G06F 3/04886* (2013.01); *G06F 8/38* (2013.01); *G06F 2203/04803* (2013.01)

(58) Field of Classification Search
CPC ............................... G06F 9/451; G06F 3/0484
USPC .......................................................... 715/704
See application file for complete search history.

(56) References Cited

U.S. PATENT DOCUMENTS

| | | | | |
|---|---|---|---|---|
| 2009/0201316 | A1* | 8/2009 | Bhatt | ...................... G06F 9/451 345/660 |
| 2011/0045904 | A1* | 2/2011 | Kawamoto | ........... A63F 13/213 463/30 |
| 2014/0029868 | A1* | 1/2014 | Lorenz | .................... G06T 11/00 382/302 |

* cited by examiner

*Primary Examiner* — Anil N Kumar
(74) *Attorney, Agent, or Firm* — Shook, Hardy & Bacon L.L.P.

(57) ABSTRACT

Systems and methods provide for a visual history of state changes for content of a document that is being modified within a content editing application. When modifications are made to the content within the content editing application, the modifications are recorded as state changes, and a graphical representation is generated for the modified content at each state change. The graphical representations with associated state changes are presented in a visual history area allowing the user to visually identify the state of the content corresponding to each graphical representation. The user can select a particular graphical representation from the visual history area and the content is transformed to the state corresponding to the selected graphical representation.

19 Claims, 7 Drawing Sheets

VISUAL HISTORY FOR CONTENT STATE CHANGES

BACKGROUND

As content is increasingly created and consumed in digital formats, content authors need to rely heavily on content editing applications that have robust capabilities for creating and modifying content efficiently. Some content editing applications record modifications that content authors make to content of documents and allow the content authors to undo and/or redo those modifications to get back to various states of the content. The recorded modifications made to content are typically presented to a content author within a content editing application as a textual description of the modifications. There are, however, inherent inefficiencies in presenting a content author with textual descriptions of modifications. Having to read a list of textual descriptions causes inefficiencies in the content authoring process as content authors have to read multiple textual descriptions and understand the state of the content corresponding to each textual description in order to navigate correctly to a desired state of the content. By relying on textual descriptions, current content editing applications hinder a content author's ability to quickly create and modify content, particularly for image type content. This generally time consuming approach to creating or modifying content can therefore be inefficient.

SUMMARY

Embodiments of the present invention relate to, among other things, techniques for implementing a visual state change history within a content editing application that allows users to quickly understand and navigate to different states of content resulting from modifications that have been made to the content. As a user makes modifications to the content of a document, the modifications are recognized and saved as state changes. For each state change, a graphical representation of the content in the new state is generated. The graphical representations are presented to the user in a visual history area, and the user can select a particular graphical representation from the visual history area to navigate to a corresponding state of the content. In this way, the user can quickly and easily identify a particular state of the content from a graphical representation and then navigate to that particular content state by selecting that graphical representation.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
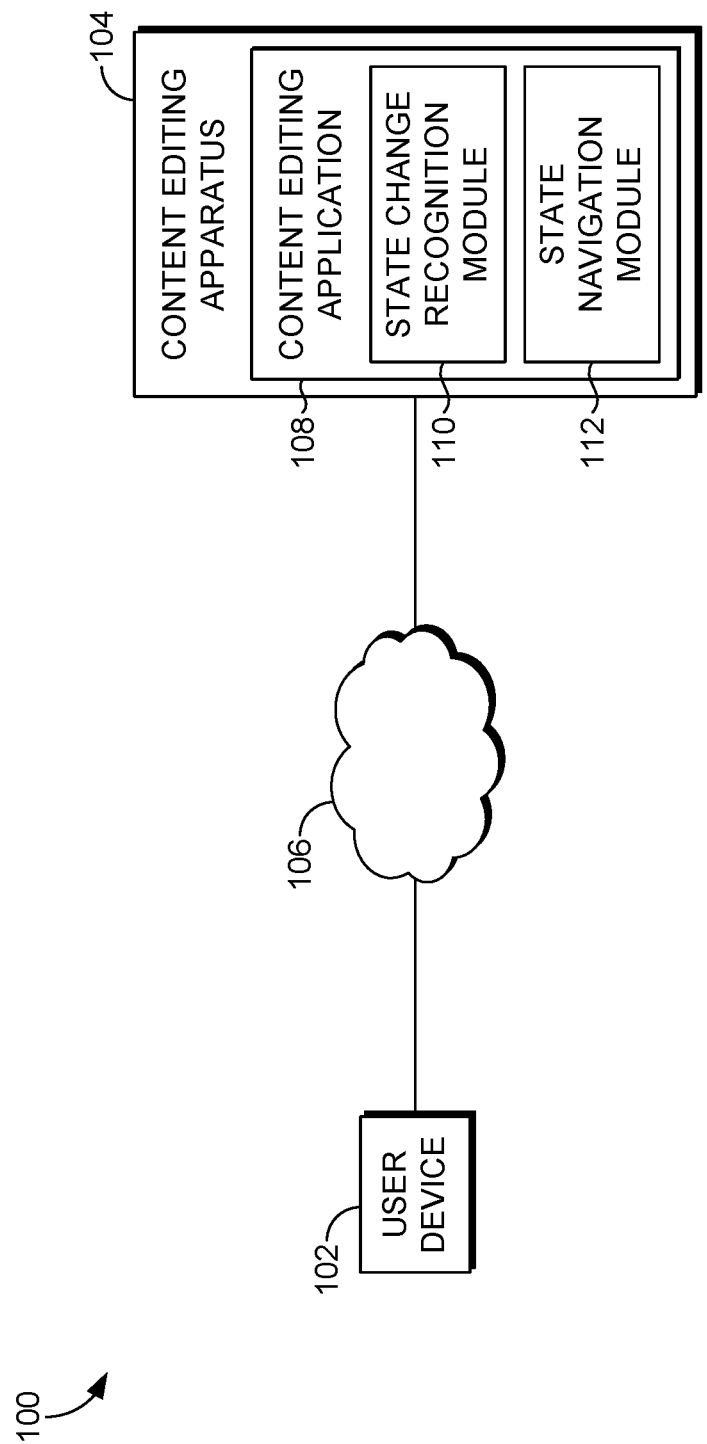
FIG. 1 is a is a block diagram illustrating an exemplary system architecture, in accordance with implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the technology disclosed herein are directed towards providing a visual history feature that captures modifications to content of a document and assigns a graphical representation to each state of the content as the content is being modified. In this way, a user can visualize changes associated with different states of the content by inspecting the graphical representations to obtain a quick understanding of which particular content state corresponds to each graphical representation. A user can quickly move to a specific state of the content by selecting the appropriate graphical representation. A user is thus able to move backwards and forwards through a progression of content modifications to undo and/or redo the modifications by interacting with a series of graphical representations of different states of the content.

In accordance with implementations of the technology disclosed herein, a content editing application provides a content area for presenting and editing content of a document. Additionally, a visual history area presents graphical representations of different states of the content that reflect modifications the user has made to the content. As the user is modifying content of a document, the modifications are recorded as state changes between states of the content. For example, given an image, a user might change the background color of the image using an input command. In this scenario, the user has changed the image from a first state to a second state. With each state change, a graphical representation of content in the new state is generated, for example, as a thumbnail, and each graphical representation is presented in the visual history area to reflect the various states of the content. Additionally, each state change (i.e., reflecting a modification to the content between two states) is associated with at least one corresponding graphical representation. In this way, a user can select any one of the graphical representations from the visual history area and the content in the state corresponding to the selected graphical representation is presented in the content area. As such, the user can employ the graphical representations in the visual history area to quickly undo and/or redo modifications to obtain a desired state of the content in the content area.

Turning now to FIG. 1, a diagram of a system 100 is depicted in which one or more embodiments of the present disclosure can be practiced. It should be understood that this and other arrangements described herein are set forth only as examples. Other arrangements and elements (e.g. machines, interfaces, functions, orders, and groupings, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user device 102 interacting with a content editing apparatus 104 to edit content of documents. Each of the user device 102 and content editing apparatus 104 shown in FIG. 1 can be provided on one or more computer devices, such as the computing device 500 of FIG. 5, discussed below. As shown in FIG. 1, the user device 102 and the content editing apparatus 104 can communicate via a network 106, which may include, without limitation, one or more local area networks (LANs) and/or wide area networks (WANs). Such networking environments are commonplace in offices, enterprise-wide computer networks, intranets, and the Internet. It should be understood that any number of user devices and content editing apparatuses may be employed within the system 100 within the scope of the present invention. Each may comprise a single device or multiple devices cooperating in a distributed environment. For instance, the content editing apparatus 104 could be provided by multiple server devices collectively providing the functionality of the content editing apparatus 104 as described herein. Additionally, other components not shown may also be included within the network environment.

A user employs the user device 102 to interact with the content editing apparatus 104 to generate and modify content of documents. The user device 102 can be any type of computing device such as, for instance, a personal computer (PC), tablet computer, desktop computer, mobile device, or any other suitable device having one or more processors. The user device 102 may include an application for interacting with the content editing apparatus 104. The application can be, for instance, a web browser that allows the user device 102 to access the content editing apparatus 104 or a dedicated application for interacting with the content editing apparatus 104.

The content editing apparatus 104 can be implemented using one or more server devices, one or more platforms with corresponding application programming interfaces, cloud infrastructure, and the like. The content editing apparatus 104 includes a content editing application 108 that facilitates a user generating and modifying content of a document. While FIG. 1 illustrates a configuration in which the content editing application 108 is provided on a device separate from the user device 102 via a networked environment, it should be understood that in further configurations, the content editing application 108 can be provided as a local application on the user device 102.

The content editing application 108 can retrieve and open a document from local storage on the user device 102 or from a resource remote from the user device 102 (e.g., a data server or the content editing apparatus 108). In accordance with embodiments described herein, the document can be an electronic representation of any type of content, such as, for instance, text, an image, a series of images, a video, or a video clip.

The content editing application 108 provides a graphical user interface (GUI) for display on the user device 102. The GUI includes a content area for displaying the content of a document and allows the user to modify the content in the content area. Once content of a document is displayed in the content area, the content editing application 108 can receive commands to alter, modify, or otherwise change the content in the content area. In this way, the content can be altered from one state to another state. The alteration between states can be based on a single modification applied to the content or multiple modifications applied to the content.

In accordance with embodiments of the present invention, the GUI provided by the content editing application 108 also includes a visual history area that displays graphical representations of different states of the content and allows the user to navigate to different states of the content by selecting the graphical representations from the visual history area. As shown in FIG. 1, the content editing application 108 includes a state change recognition module 110 and a state navigation module 112 to implement the visual history features described herein.

The state change recognition module 110 generally operates to record modifications made to content as state changes and associate the state changes with graphical representations of the states. For instance, the state change recognition module 110 can facilitate associating state changes with graphical representations using the method 200 of FIG. 2 discussed below.

When a modification or a set of modifications is made to content to alter the content from a previous state to a new state, the state change recognition module 110 records the modification or set of modifications as a state change between the two states. In accordance with various embodiments of the technology disclosed herein, the state change recognition module 110 can recognize a state change for each individual modification to the content, or it can recognize a state change for a series of modifications to the content. In some implementations, state change recognition can be manual, such that a state change is recorded when the user manually indicates to record a state change. In such implementations, the state change would incorporate all modifications that have been made since the last time a state change was recorded. In some configurations, state change recognition can be automated, for example, by using factors, such as user input patterns, time, or type of modification, to determine when to recognize a state change.

The state change recognition module 110 also generates a graphical representation of the content in each state. The graphical representations of various states of the content are displayed in a visual history area of the GUI. In some implementations, the graphical representation of content in a new state is generated when a state change is recognized and recorded based on one or more modifications to the content. The graphical representation reflects the content in the new state as currently displayed in the content area of the GUI. The graphical representation of the content can be generated, for instance, by creating a thumbnail image of the content or capturing a screenshot of the content. The resulting graphical representation generated is therefore not necessarily the content itself, but can be a representation of the content (e.g., a reduced-size representation) such that a user can identify the associated state of the content. In some configurations, a graphical representation of a state is not necessarily created when a state change is recognized and recorded. Instead, a graphical representation for a state can be created at a later time, such as, when the graphical representation is to be displayed in a GUI. For instance, the memory data for a previous state can be maintained and later used to create a graphical representation for that previous state.

The state change recognition module 110 associates the state change with a graphical representation. In various configurations, the state change can be associated with a graphical representation of the content in the previous state and/or the state change can be associated with a graphical representation of the content in the new state.

The state navigation module 112 facilitates changing the content in the content area of the GUI to another state of the content corresponding to a selected graphical representation, for instance, using the method 300 of FIG. 3 described below. This allows the user to either undo or reapply modifications made between states. In this way, the user can navigate to a specific content state by selecting the associated graphical representation.

Generally, graphical representations corresponding to various states of the content are displayed in the visual history area of the GUI. This may include graphical representations corresponding to previous states and/or subsequent states from the state of the content currently being displayed in the content area. The graphical representations can be displayed in the visual history area in a logical progression corresponding to an order in which each state was generated.

When a user selects a graphical representation from the visual history area, the state navigation module 112 operates to change the content in the content area to the state of the content corresponding to the selected graphical representation. In some implementations, the content in the content area is changed by identifying one or more modifications made between the state of the content initially displayed in the content area when the graphical representation is selected and the state of the content corresponding to the selected graphical representation. The modifications are identified from at least a state change associated with the graphical representation of the state initially displayed and/or the graphical representation selected by the user. If there are intervening states between the initial state and the selected state, the modifications of the intervening states are also identified. The identified modifications are then either removed or reapplied to the content in the initial state to provide the content in the state corresponding to the selected graphical representation.

Figure 2:
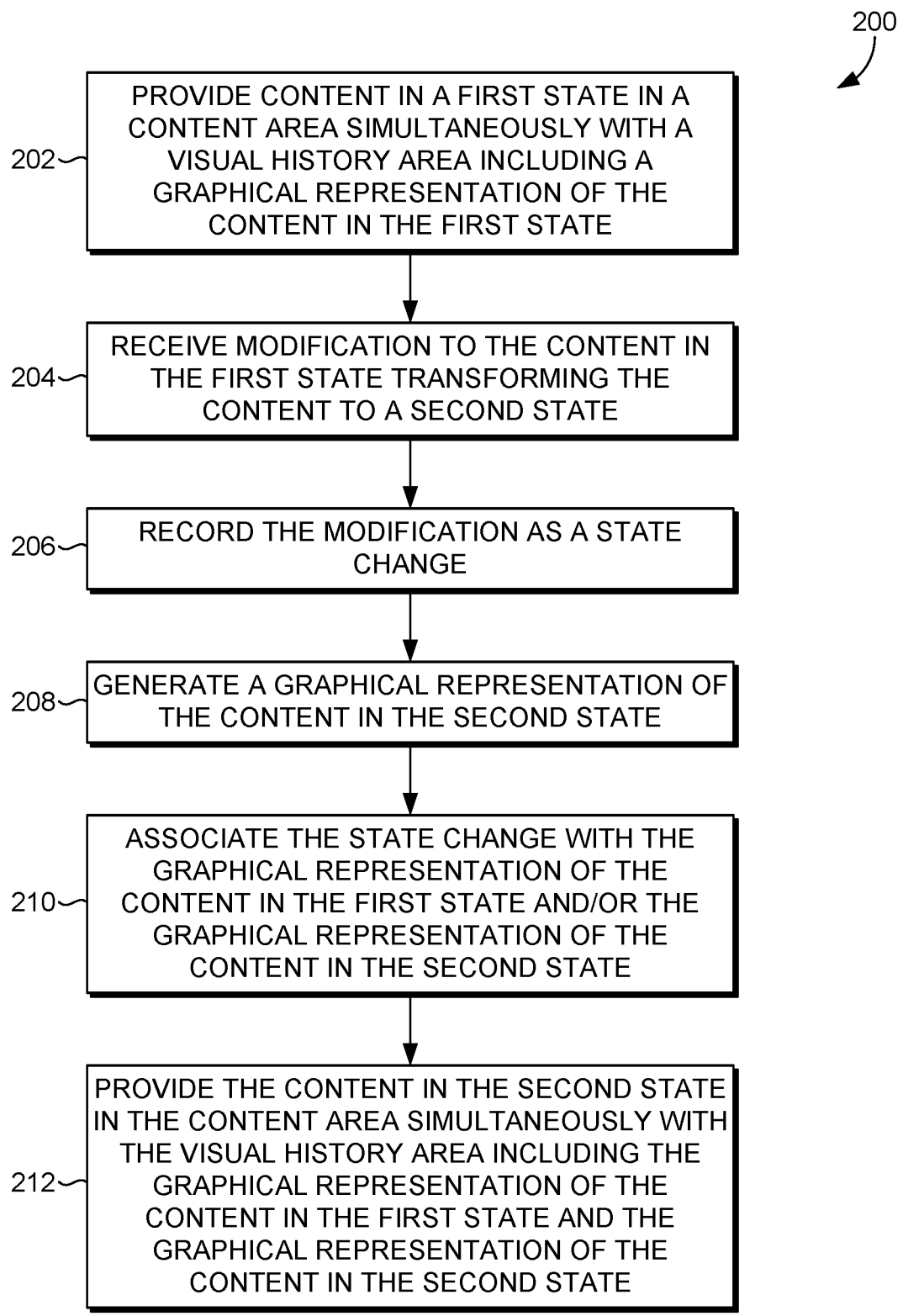
FIG. 2 is a flow diagram showing a method for implementing a visual history of state changes for content of a document, in accordance with implementations of the present disclosure.

With reference now to FIG. 2, a flow diagram 200 is provided illustrating a method 200 for implementing a visual history of state changes for content of a document in accordance with various embodiments of the present disclosure. The method 200 may be performed, for instance, by the state change recognition module 110 of FIG. 1. Each block or step of the method 200 and other methods described herein comprises a computing process that may be performed using any combination of hardware, firmware, and/or software. For instance, various functions may be carried out by a processor executing instructions stored in memory. The methods may also be embodied as computer-useable instructions stored on computer storage media. The methods may be provided by a standalone application, a service or hosted service (stand-alone or in combination with another hosted service), or plug-in to another product, to name a few.

As shown at block 202, content of a document in a first state is provided for display within a content area of a content editing application (e.g., the content editing application 108 of FIG. 1). The content of the document is displayed within the content area simultaneously with a visual history area that displays at least a graphical representation of the content in the first state. When the content is initially presented in the content area without any modifications to the content, an initial or baseline graphical representation of the content in this initial state is generated. In this instance, the graphical representation for this initial state does not have any associated state changes since no changes have been applied to the initial content. In other instances, one or more changes have already been made to the content, and the visual history area includes a number of graphical representations that are associated with corresponding state changes.

A modification is applied to the content that transforms the content from the first state to a second state, as shown at block 204. For instance, the user can employ the content editing application to modify the content. In response to the modification, a state change is recorded that captures the modification between the first state and the second state of the content, as shown at block 206. Additionally, a graphical representation of the content in the second state is generated, as shown at block 208. The graphical representation can, for example, be a thumbnail, an icon image, and the like such that it is visibly apparent which content state it represents. At block 210, the state change is associated with the graphical representation of the content in the first state and/or the graphical representation of the content in the second state.

As shown at block 212, the content in the second state is provided for display within the content area of the content editing application while the visual history area simultaneously displays both the graphical representation of the content in the second state and the graphical representation of the content in the first state.

Figure 3:
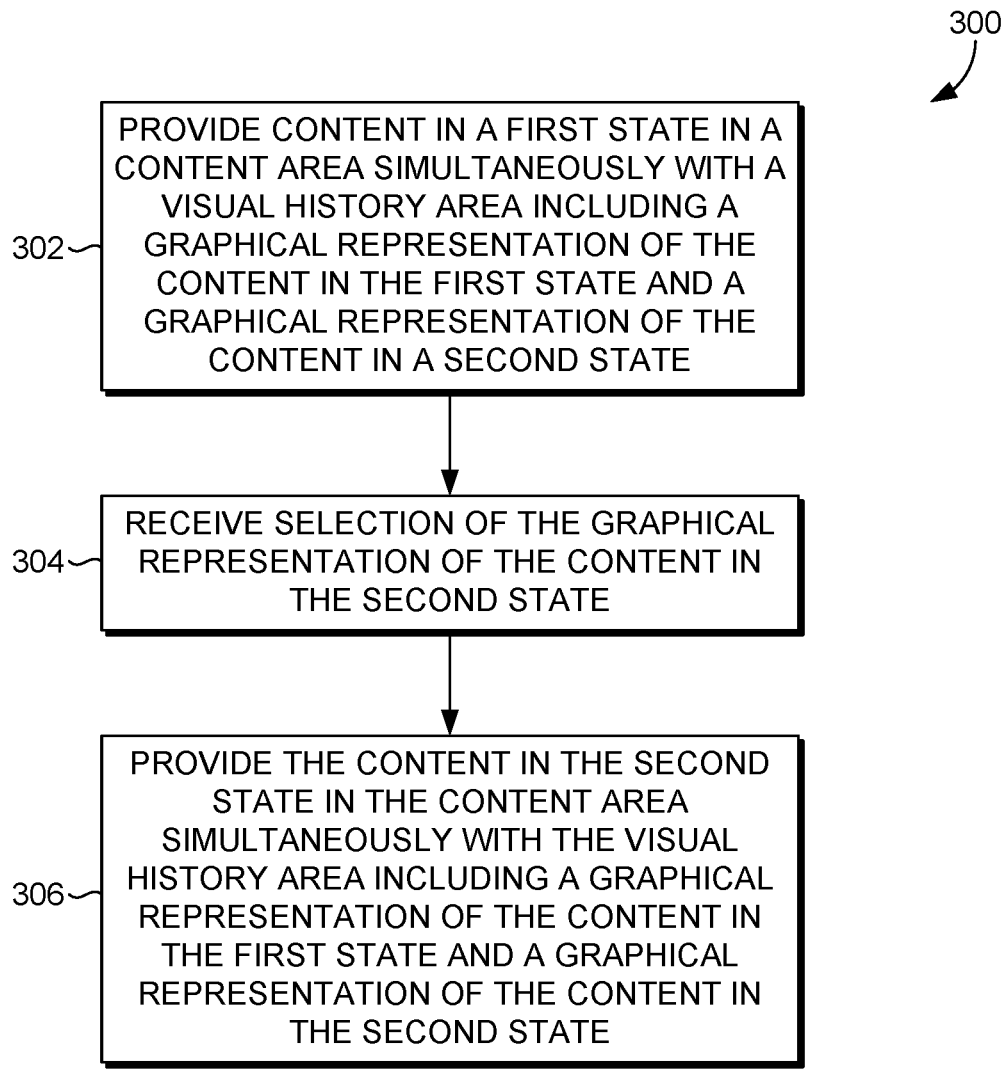
FIG. 3 is a flow diagram showing a method for using a visual history of state changes for content to navigate between states of the content, in accordance with implementations of the present disclosure.

Turning next to FIG. 3, a flow diagram is provided illustrating a method 300 for using a visual history of state changes for content of a document to navigate to a different state of the content. As shown at block 302, content of a document in a first state is displayed in a content area while a visual history area simultaneously displays a graphical representation of the content in the first state and a graphical representation of the content in a second state. In some configurations, the graphical representation of the content in the first state is highlighted to reflect that the content area currently displays the content in the first state. Any type of highlighting could be used, such as, for instance, placing a box around the graphical representation or changing a coloring of the graphical presentation.

The second state can be a state prior to or subsequent to the first state. For instance, the second state can be a state of the content before a modification was made to the content to transform the content from the second state to the first state. As another example, the second state can be a state of the content after a modification was made to the content to transform the content from the first state to the second state. In some instances, one or more other states are present between the first state and the second state, and the visual history area includes graphical representations of the other states.

A selection of the graphical representation of the content in the second state is received, as shown at block 304. In response to the received selection, the content in the second state is provided for display within the content area of the content editing application while the visual history area continues to display the graphical representation of the content in the first state and the graphical representation of the content in the second state as shown at block 306. In some embodiments, the graphical representation of the content in the second state is highlighted to reflect that the content area currently displays the content in the second state.

In some configurations, the content in the content area is transformed from the first state to the second state by applying modifications from a state change associated with the graphical representation of the first state and/or the graphical representation of the second state. For instance, if the first state is a state of the content after a modification was applied to the second state, the modification is removed from the content to transform the content from the first state to the second state. As another example, if the first state is a state of the content before a modification was applied to the first state to create the second state, the modification is reapplied to the content to transform the content from the first state to the second state. If there are other states of the content between the first state and the second state, the modifications of state changes associated with those intervening states are also reapplied or removed.

Figure 4A:
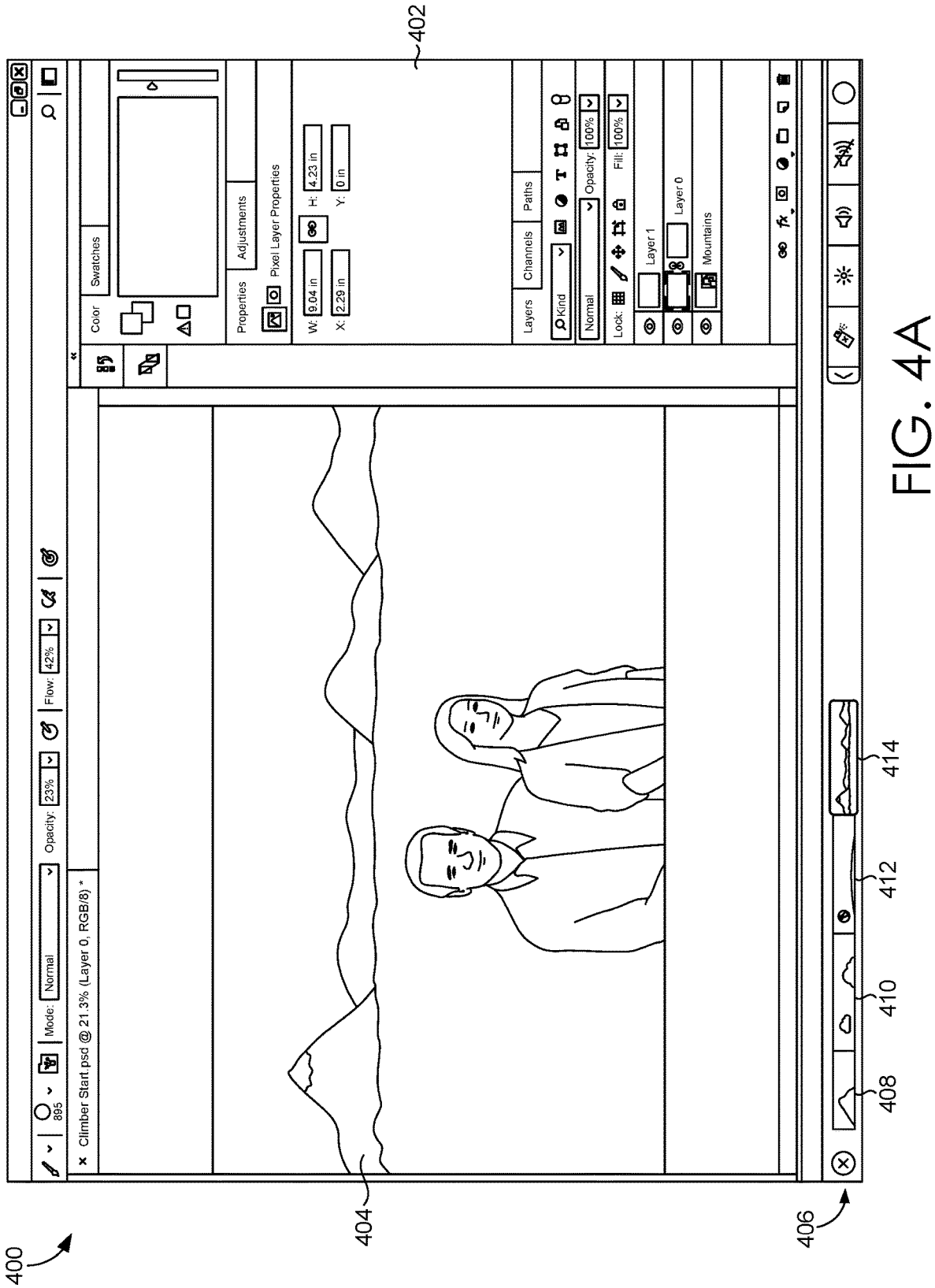
FIGS. 4A-4C are illustrations of an exemplary graphical user interface implementing a visual history of state changes for content of a document, in accordance with implementations of the present disclosure.
Figure 4B:
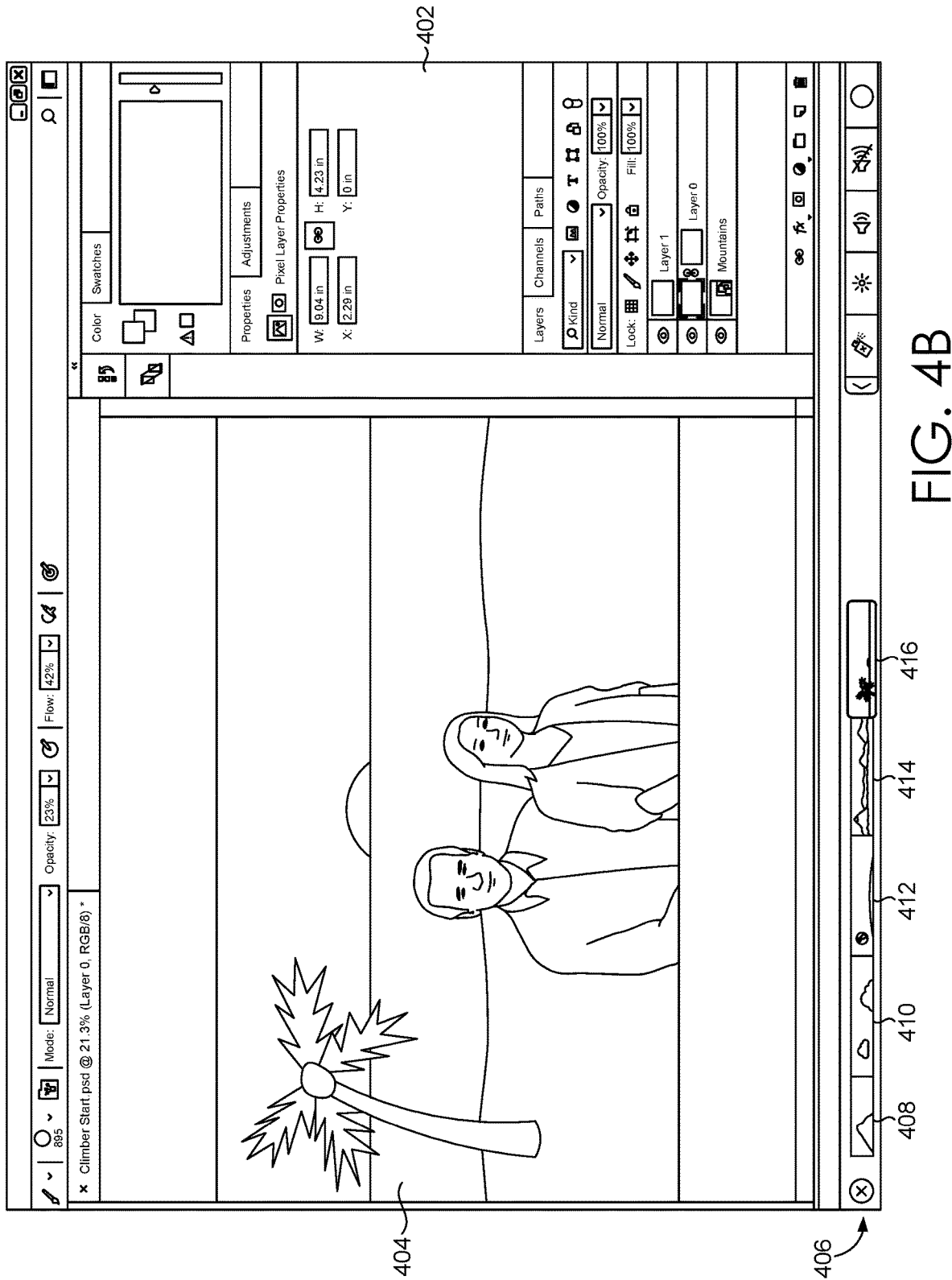
Figure 4C:
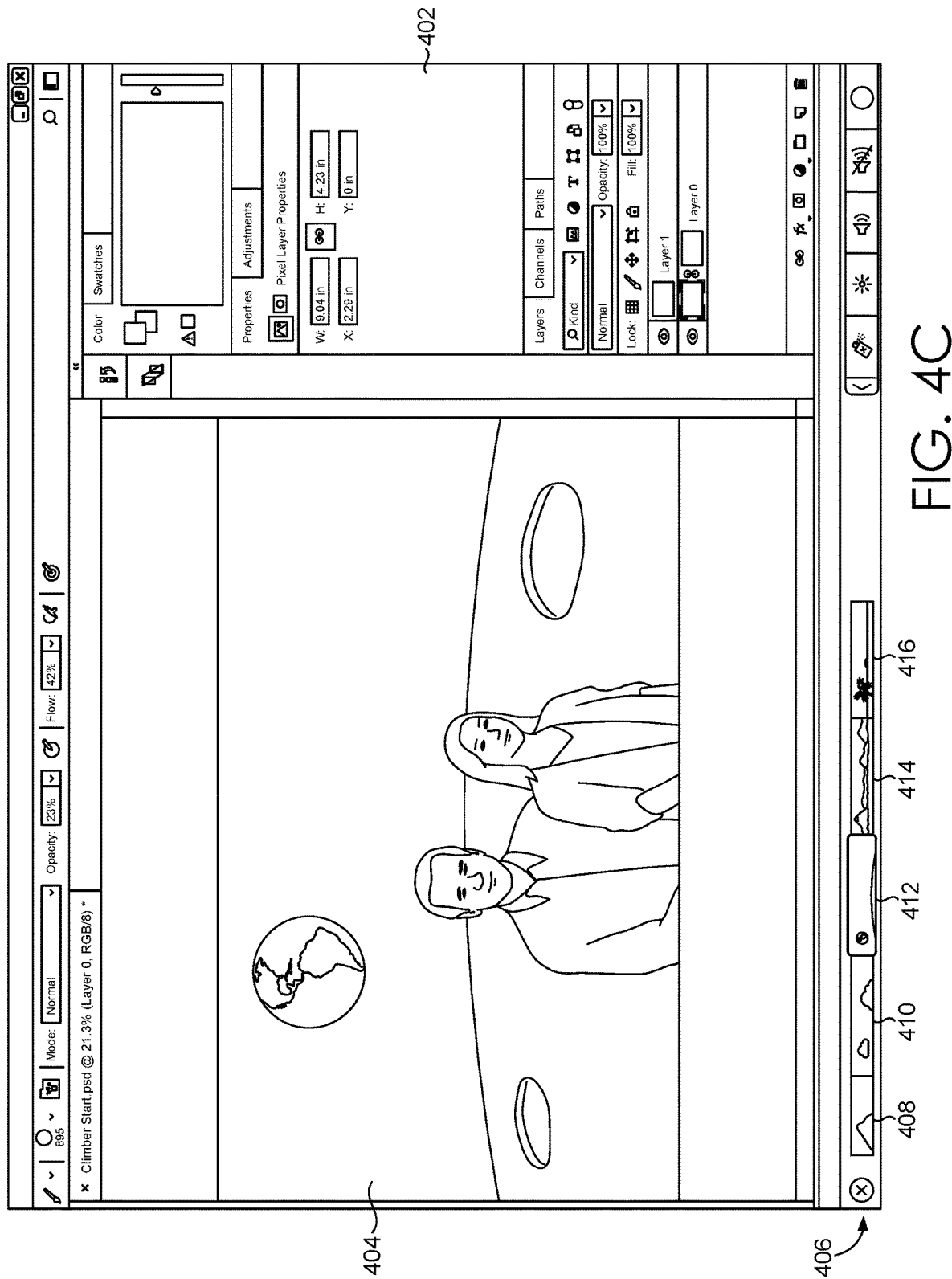

In accordance with some embodiments of the technology described herein, with reference now to FIGS. 4A-4C, exemplary illustrations of a graphical user interface implementing a visual history of state changes for content of a document are depicted. Turning initially to FIG. 4A, a graphical user interface (GUI) 400 provided by a content editing application is shown. The GUI 400 includes, among other features, a content area 404, an editing controls area 402, and a visual history area 406. The content area 404 is configured to display content of a document and allows a user to interact with and modify the content. The editing controls area 402 includes any number of interactive editing tools or commands to modify the content displayed in the content area 404. The visual history area 406 depicts a horizontal array of graphical representations 408, 410, 412, 414 of the content in various states. In the present example, the graphical representations 408, 410, 412, 414 correspond to a first state, a second state, a third state, and a fourth state of the content, respectively. Each graphical representation 408, 410, 412, 414 may be associated with a state change that identifies a modification of the content from a prior state to a subsequent state. In particular, the graphical representation 408 corresponds to an initial state of the content, the graphical representation 410 corresponds to a state after a modification to the content in the first state, the graphical representation 412 corresponds to a state after a modification to the content in the second state, and the graphical representation 414 corresponds to a state after a modification to the content in the third state. It should be understood that FIG. 4A provides a visual history area 406 for illustration purposes only, and that any combination and ordering may be used with respect to the graphical representations.

The content area 404 shown in FIG. 4A displays the content in the fourth state corresponding to the graphical representation 414. As such, the graphical representation 414 is highlighted in the visual history area 406 by including a box around the graphical representation 414. This reflects that the content currently displayed in the content area 404 corresponds to the graphical representation 414.

When a modification is made to the content in the content area 404 of FIG. 4A, a graphical representation 416 is generated and displayed in the visual history area 406, as shown in FIG. 4B. In that case, the newly modified content (e.g., content in a fifth state) is displayed in the content area 404, and the graphical representation 416 is shown as highlighted in the visual history area 406. Additionally, a state change is recorded based on the modification and associated with the graphical representation 414 and/or the graphical representation 416.

While the content area 404 displays the content in the fifth state associated with the graphical representation 416 as shown in FIG. 4B, a user can revert the content back to any of the previous states by selecting one of the other graphical representations 408, 410, 412, 414 from the visual history area 406. For instance, suppose the user selects the graphical representation 412 associated with the third state of the content. In response to the user selection, the modifications made to the content between the third state and the fifth state are removed, and the content in the third state associated with graphical representation 412 is displayed in the content area 404, as shown in FIG. 4C. Additionally, the graphical representation 412 is highlighted in the visual history area 406 to reflect that the currently displayed content in the content area 404 corresponds to the state reflected by the graphical representation 412.

As shown in FIG. 4C, after the user selects the graphical representation 412 to revert back to the third state of the content, the subsequent graphical representations 414, 416 remain. As such, the user could select one of the graphical representations 414, 416 to have the content in the content area 404 changed to the fourth or fifth state. However, in some configurations, if the user modifies the content in the third state in FIG. 4C, a new graphical representation is generated and displayed in the visual history area 406, while the graphical representations 414, 416 are removed.

Accordingly, various aspects of technology for implementing a visual history for state change functionality for content are described. It should be understood that various features, sub-combinations, and modifications of the embodiments described herein are of utility and may be employed in other embodiments without reference to other features or sub-combinations. Moreover, the order and sequences of steps shown in the example methods 200 and 300 are not meant to limit the scope of the present invention in any way, and in fact, the steps may occur in a variety of different sequences within embodiments hereof. Such variations and combinations thereof are also contemplated to be within the scope of embodiments of the invention.

Figure 5:
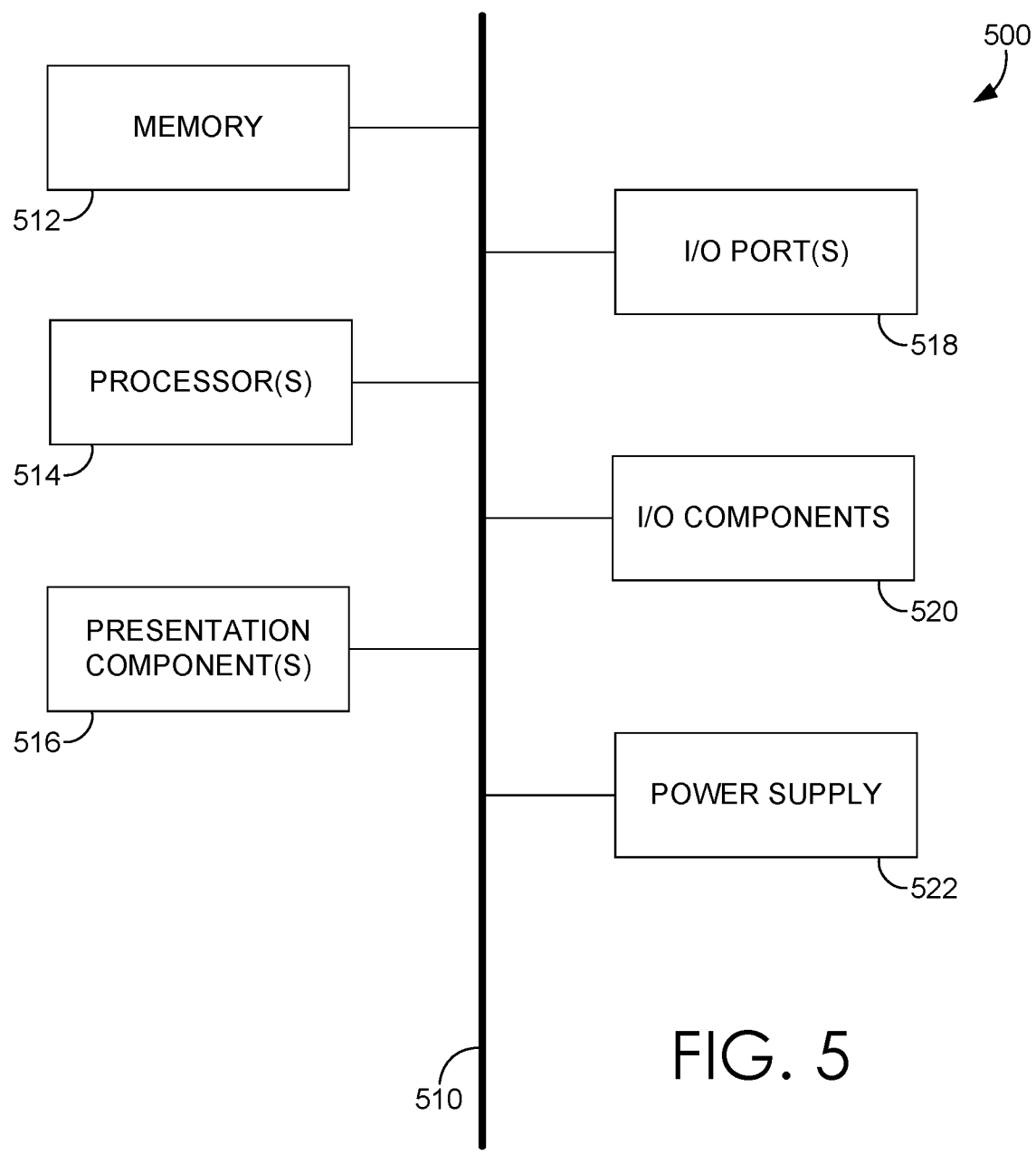
FIG. 5 is a block diagram of an exemplary computing environment suitable for use in accordance with some implementations of the present disclosure.

Having described various embodiments of the invention, an exemplary computing environment suitable for implementing embodiments of the invention is now described. With reference to FIG. 5, an exemplary computing device is provided and referred to generally as computing device 500. The computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

Embodiments of the invention may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, more specialty computing devices, etc. Embodiments of the invention may also be practiced in distributed computing environments where tasks are performed by remote-processing devices that are linked through a communications network. In a distributed computing environment, program modules may be located in both local and remote computer storage media including memory storage devices.

With reference to FIG. 5, computing device 500 includes a bus 510 that directly or indirectly couples the following devices: memory 512, one or more processors 514, one or more presentation components 516, one or more input/output (I/O) ports 518, one or more I/O components 520, and an illustrative power supply 522. Bus 510 represents what may be one or more busses (such as an address bus, data bus, or combination thereof). Although the various blocks of FIG. 5 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 5 is merely illustrative of an exemplary computing device that can be used in connection with one or more embodiments of the present invention. Distinction is not made between such categories as "workstation," "server," "laptop," "handheld device," etc., as all are contemplated within the scope of FIG. 5 and with reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors 514 that read data from various entities such as memory 512 or I/O components 520. Presentation component(s) 516 presents data indications to a user or other device. Exemplary presentation components include a display device, speaker, printing component, vibrating component, and the like.

The I/O ports 518 allow computing device 500 to be logically coupled to other devices, including I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as stereoscopic camera systems, infrared camera systems, RGB camera systems, and combinations of these, for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

As described above, implementations of the present disclosure relate to providing a visual history of state changes for content of a document that facilitate returning to different states of the content while editing the document. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when executed by a computing device, cause the computing device to perform operations, the operations comprising:

causing content to be presented in a first state within a content area of a content editing application, wherein the content is presented in the first state simultaneously with a graphical representation of the content in the first state within a visual history area of the content editing application, the visual history area comprising graphical representations displayed in a logical progression corresponding to an order in which subsequent states of the content are generated to include modifications made to previous states of the content;

in response to a modification to the content in the first state to provide the content in a second state, recording the modification as a state change between the first state and the second state of the content, wherein the content in the second state is generated subsequent to the content in the first state within the order;

generating a graphical representation of the content in the second state;

associating the state change with the graphical representation of the content in the first state and/or the graphical representation of the content in the second state; and causing the content to be presented in the second state within the content area, wherein the content is presented in the second state simultaneously with the visual history area presenting the graphical representation of the content in the second state and the graphical representation of the content in the first state.

2. The one or more computer storage media of claim 1, wherein the operations further comprise: in response to an indication selecting the graphical representation of the content in the first state, causing the content to be presented in the first state in the content area simultaneously with the visual history area presenting the graphical representation of the content in the second state and the graphical representation of the content in the first state.

3. The one or more computer storage media of claim 2, wherein causing the content to be presented in the first state within the content area in response to the indication selecting the graphical representation of the content in the first state comprises identifying the modification from the state change and undoing the modification to the content in the second state to provide the content in the first state.

4. The one or more computer storage media of claim 1, wherein the operations further comprise:

in response to a modification to the content in the second state to provide the content in a third state, recording the modification to the content in the second state as a second state change between the second state and the third state of the content;

generating a graphical representation of the content in the third state;

associating the second state change with the graphical representation of the content in the second state and/or the graphical representation of the content in the third state; and causing the content to be presented in the third state within the content area, wherein the content is presented in the third state simultaneously with the visual history area presenting the graphical representation of the content in the first state, the graphical representation of the content in the second state, and the graphical representation of the content in the third state.

5. The one or more computer storage media of claim 4, wherein the operations further comprise: in response to an indication selecting the graphical representation of the content in the first state, causing the content to be presented in the content area in the first state simultaneously with the visual history area presenting the graphical representation of the content in the first state, the graphical representation of the content in the second state, and the graphical representation of the content in the third state.

6. The one or more computer storage media of claim 5, wherein the operations further comprise:

subsequent to the indication selecting the graphical representation of the content in the first state and in response to a second modification to the content in the first state to provide the content in a fourth state, recording the second modification as a third state change between the first state and the fourth state of the content;

generating a graphical representation of the content in the fourth state;

associating the third state change with the graphical representation of the content in the first state and/or the graphical representation of the content in the fourth state; and causing the content to be presented in the fourth state within the content area, wherein the content is presented in the fourth state simultaneously with the visual history area presenting the graphical representation of the content in the fourth state and the graphical representation of the content in the first state.

7. The one or more computer storage media of claim 1, wherein the graphical representation of the content in the first state is highlighted within the visual history area when the content is presented in the first state within the content area, and wherein the graphical representation of the content in the second state is highlighted within the visual history area when the content is presented in the second state within the content area.

8. The one or more computer storage media of claim 1, wherein the state change includes one or more additional modifications of the content from the first state to the content in the second state.

9. The one or more computer storage media of claim 1, wherein the content comprises at least one selected from the following: a text, an image, and a video.

10. The one or more computer storage media of claim 1, wherein the graphical representation of the content in the first state comprises a thumbnail image of the content in the first state and the graphical representation of the content in the second state comprises a thumbnail image of the content in the second state.

11. A computing system comprising:

one or more processors; and one or more computer storage media storing computer-useable instructions that, when used by the one or more processors, cause the one or more processors to:

cause content to be presented in a first state within a content area for editing the content, wherein the content is presented in the first state simultaneously with a visual history area presenting a plurality of graphical representations of the content in a plurality of other states, the visual history area comprising graphical representations displayed in a logical progression corresponding to an order in which subsequent states of the content are generated to include modifications made to previous states of the content;

receive a selection of a graphical representation of the content in a second state from the plurality of graphical representations of the content within the visual history area, wherein the content in the second state is generated subsequent to the content in the first state within the order based on a modification to the content in the first state; and in response to the selection of the graphical representation of the content in the second state, cause the content to be presented in the second state within the content area simultaneously with the visual history area presenting the plurality of graphical representations of the content, wherein the content is presented in the second state based on a recorded state change reflecting the modification between the content in the first state and the content in the second state.

12. The system of claim 11, wherein the content is presented in the second state within the content area by:
   accessing a state change associated with a graphical representation of the content in the first state and/or the graphical representation of the content in the second state; and
   applying one or more changes to the content in the first state based on one or more modifications recorded by the state change to transform the content from the first state to the second state.

13. The system of claim 12, wherein applying the one or more changes to the content in the first state comprises undoing the one or more modifications to the content in the first state.

14. The system of claim 12, wherein applying the one or more changes to the content in the first state comprises reapplying the one or more modifications to the content in the first state.

15. The system of claim 12, wherein an intervening state is present between the first state and the second state with a second state change corresponding to the intervening state, the second state change recording one or more additional modifications, and wherein applying the one or more changes to the content in the first state comprises applying at least one change based on the one or more additional modifications.

16. The system of claim 11, wherein a graphical representation of the content in the first state is highlighted within the visual history area when the content is presented in the first state within the content area, and wherein the graphical representation of the content in the second state is highlighted within the visual history area when the content is presented in the second state within the content area.

17. The system of claim 11, wherein the content comprises at least one selected from the following: a text, an image, and a video.

18. The system of claim 11, wherein each graphical representation of the content within the visual history area comprises a thumbnail image of the content in one of the plurality of states.

19. A computer system comprising:
   means for providing a visual history area presenting graphical representations of content in conjunction with a content area presenting the content, the graphical representations of the visual history area being presented in a logical progression corresponding to an order in which states of content are generated, each graphical representation of the order corresponding to a different state of the content, wherein subsequent states of the content are generated to include modifications made to previous states of the content; and
   means for changing the content presented within the content area to a particular state of the content in response to a selection of one of the graphical representations of the content from the visual history area.

* * * * *